(12) United States Patent
Tsai et al.

(10) Patent No.: US 12,510,788 B2
(45) Date of Patent: *Dec. 30, 2025

(54) ELECTRONIC DEVICE

(71) Applicant: Innolux Corporation, Miaoli County (TW)

(72) Inventors: Chia-Hao Tsai, Miaoli County (TW); Ming-Jou Tai, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 12 days.

This patent is subject to a terminal disclaimer.

(21) Appl. No.: 18/766,695

(22) Filed: Jul. 9, 2024

(65) Prior Publication Data

US 2024/0361641 A1   Oct. 31, 2024

Related U.S. Application Data

(63) Continuation of application No. 18/312,589, filed on May 4, 2023, now Pat. No. 12,072,584.

(30) Foreign Application Priority Data

Jun. 6, 2022 (CN) .......................... 202210628722.6

(51) Int. Cl.
G02F 1/1362 (2006.01)
G02F 1/1339 (2006.01)
G02F 1/1333 (2006.01)
G02F 1/1368 (2006.01)

(52) U.S. Cl.
CPC .... *G02F 1/136209* (2013.01); *G02F 1/13394* (2013.01); *G02F 1/133377* (2013.01); *G02F 1/136286* (2013.01); *G02F 1/1368* (2013.01)

(58) Field of Classification Search
None
See application file for complete search history.

(56) References Cited

U.S. PATENT DOCUMENTS 12,072,584 B2 * 8/2024 Tsai .................... G02F 1/13398

* cited by examiner

*Primary Examiner* — Dung T Nguyen
(74) *Attorney, Agent, or Firm* — JCIPRNET

(57) ABSTRACT

An electronic device including a substrate, a gate line, two adjacent data lines, a semiconductor layer and a metal layer is provided. The gate line is disposed on the substrate and extends along a first direction. The two adjacent data lines are disposed on the substrate and intersects with the gate line. The semiconductor layer is disposed on the substrate and has a channel area. The metal layer is disposed between the substrate and the semiconductor layer, wherein the metal layer are overlapped with the two adjacent data lines. The metal layer has a section overlapped with the channel area, the section has a first width ($W_{LS1}$) along a second direction perpendicular to the first direction, the gate line has a second width ($W_G$) along the second direction, and the first width and the second width satisfy a relational expression below:

$$W_G \leq W_{LS1} \leq 10 * W_G.$$

10 Claims, 7 Drawing Sheets ial no. 202210628722.6, filed on Jun. 6, 2022. The entirety of each of the above-mentioned patent applications is hereby incorporated by reference herein and made a part of this specification.

ELECTRONIC DEVICE

CROSS-REFERENCE TO RELATED APPLICATION

This application is a continuation application of and claims the priority benefit of U.S. application Ser. No. 18/312,589, filed on May 4, 2023, which claims the priority benefit of Chinese application serial no. 202210628722.6, filed on Jun. 6, 2022. The entirety of each of the above-mentioned patent applications is hereby incorporated by reference herein and made a part of this specification.

BACKGROUND

Technical Field

The disclosure involves an electronic device.

Description of Related Art

With the technological progress of modern electronic products and the increasing demands of consumers, electronic devices on the market usually have to be prepared with high resolution. However, electronic devices with high resolution are easily affected by factors such as process and make their opening rate drops.

SUMMARY

The disclosure provides an electronic device, including an electronic device that may have an enhanced opening rate.

According to the embodiment of the disclosure, the electronic device includes a substrate, a gate line, two adjacent data lines, a semiconductor layer and a metal layer. The gate line is disposed on the substrate and extends along a first direction. The two adjacent data lines are disposed on the substrate and intersects with the gate line. The semiconductor layer is disposed on the substrate and has a channel area. The metal layer is disposed between the substrate and the semiconductor layer, wherein the metal layer are overlapped with the two adjacent data lines. The metal layer has a section overlapped with the channel area, the section has a first width ($W_{LS1}$) along a second direction perpendicular to the first direction, the gate line has a second width ($W_G$) along the second direction, and the first width and the second width satisfy a relational expression below: $W_G \leq W_{LS1} \leq 10*W_G$.

In order to make the aforementioned features and advantages of the disclosure comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
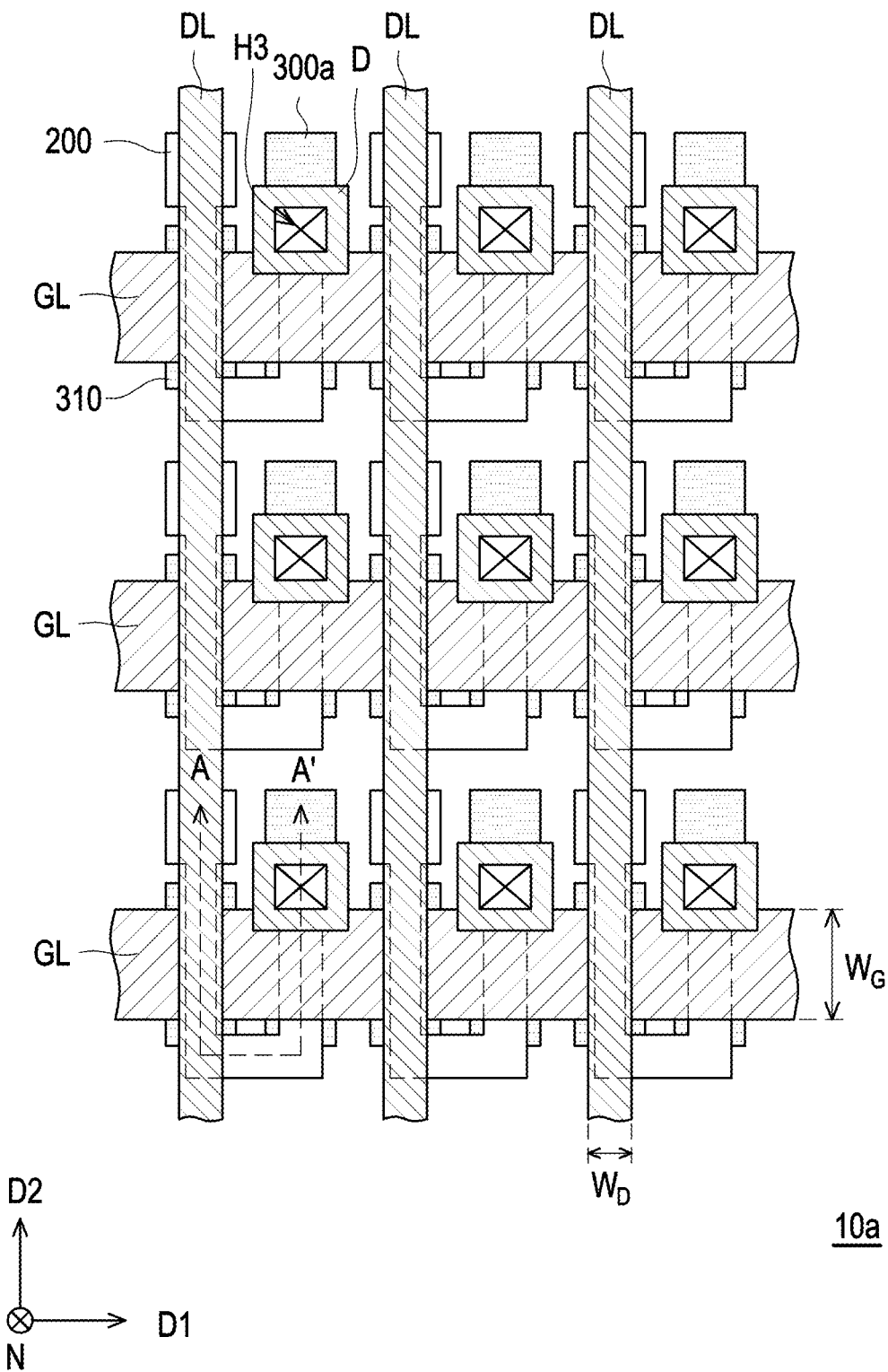
FIG. 1 is a top schematic view of an electronic device according to the first embodiment of the disclosure.

This disclosure may be understood by referring to the following detailed description in conjunction with the accompanying drawings. It should be noted that, in order to facilitate understanding and for the concision of the drawings, only a part of the electronic device is shown in the drawings in this disclosure, and the specific elements in the drawings are not drawn according to actual scale. In addition, the number and size of each element in the figure are only exemplary and are not used to limit the scope of the disclosure.

In the description of the disclosure and the appended claims, certain terms will be used to refer to specific elements. Persons skilled in the art would understand that electronic device manufacturers may refer to the same elements under different names. This disclosure does not intend to distinguish between elements that have the same functions but different names. In the following description and claims, terms such as "including", "containing" and "having" are open-ended words, so that they should be interpreted as meaning "including but not limited to . . . ". Therefore, when the terms "including", "containing" and/or "having" are used in the description of the disclosure, they designate the presence of corresponding features, regions, steps, operations and/or components, but do not preclude the presence of one or more other features, regions, steps, operations, operations, and/or components.

Directional terms mentioned in the specification, such as "up", "down", "front", "rear", "left", "right", etc., only refer to directions of the drawings. Therefore, the used directional terms are illustrative, not limiting, of the disclosure. In the drawings, various figures illustrate general characteristics of methods, structures and/or materials used in particular embodiments. However, these drawings should not be construed to define or limit the scope or nature encompassed by these embodiments. For example, the relative sizes, thicknesses and positions of various layers, regions, and/or structures may be reduced or exaggerated for clarity's sake.

When a corresponding component (for example, a film layer or region) is referred to as being "on" another component, it may be directly on the other component or there may be other components therebetween. On the other hand, when a component is referred to as being "directly on another component," there is no component therebetween. In addition, when a component is referred to as being "on another component", the two components have a top-down relationship in a top view, and the component may be above or below the other component, and the top-down relationship depends on an orientation of the device.

The terms "about", "equivalent to", "substantially" or "approximately" are generally interpreted as within 20% of a given value or range, or as within 10%, 5%, 3%, 2%, 1% or 0.5% of the given value or range.

Ordinal numbers such as "first", "second" and the like used in the description and claims of the disclosure are used to modify elements, which do not imply and represent that the (or these) elements are numbered in sequence, or represent the order of a certain element and another element, or the order of the manufacturing method. The use of these ordinal numbers is only used to clearly distinguish the element with a certain name from another element with the same name. The same wording may not be used in claims of the disclosure and the specification. Accordingly, the first component in the specification may be the second component in claims of the disclosure.

It should be understood that the following embodiments may replace, reorganize, and mix the features in several different embodiments to complete other embodiments without departing from the spirit of the disclosure. As long as the features of the embodiments do not violate the spirit of the disclosure or conflict each other, they may be mixed and matched as desired.

The electrical connection or coupling described in this disclosure may refer to direct connection or indirect connection. In the case of direct connection, the terminals of the components on the two circuits are directly connected or connected to each other with a conductor line segment. In the case of indirect connection, there are switches, diodes, capacitors, inductors, resistors, other suitable components, or a combination of the above components between the terminals of the components on the two circuits, but not limited thereto.

In this disclosure, the thickness, length and width may be measured by optical microscope (OM), and the thickness or width may be obtained by measuring the cross-sectional image in the electron microscope, but not limited thereto. In addition, any two values or directions used for comparison may have certain errors. If a first value is equal to a second value, it implies that there may be an error of about 10% between the first value and the second value; if a first direction is perpendicular to a second direction, an angle between the first direction and the second direction may be between 80 degrees and 100 degrees; if the first direction is parallel to the second direction, the angle between the first direction and the second direction may be between 0 degrees and 10 degrees.

The electronic device of the disclosure may include a display device, an antenna device, a light-emitting device, a sensing device, a touching device, or a splicing device, but the disclosure is not limited thereto. The electronic device may be a bendable or flexible electronic device, but not limited thereto. The display device may be a non-self-luminous display device or a self-luminous display device. The electronic device may include, for example, diodes, liquid crystal, light-emitting diodes (LEDs), quantum dots (QDs), fluorescence, phosphor or other suitable display medium, or a combination of the above materials. The antenna device may be a liquid crystal type antenna device or a non-liquid crystal type antenna device, and the sensing device may be a sensing device for sensing capacitance, light, thermal energy or ultrasonic waves, but not limited thereto. The light-emitting diodes may, for example, include organic light-emitting diodes (OLEDs), mini LEDs, micro LEDs, or quantum dot LED (QLED, QDLED), but not limited to. The splicing device may be, for example, a display splicing device or an antenna splicing device, but is not limited thereto. It should be noted that the electronic device may be any combination of the above, but not limited thereto. In addition, the appearance of the electronic device may be rectangular, circular, polygonal, a shape with curved edges, or other suitable shapes. The electronic device may have a drive system, a control system, a light source system, . . . and other peripheral systems to support a display device, an antenna device, a wearable device (e.g., augmented reality or virtual reality), a vehicle-mounted device (e.g., a car windshield glass) or splicing device.

Figure 2:
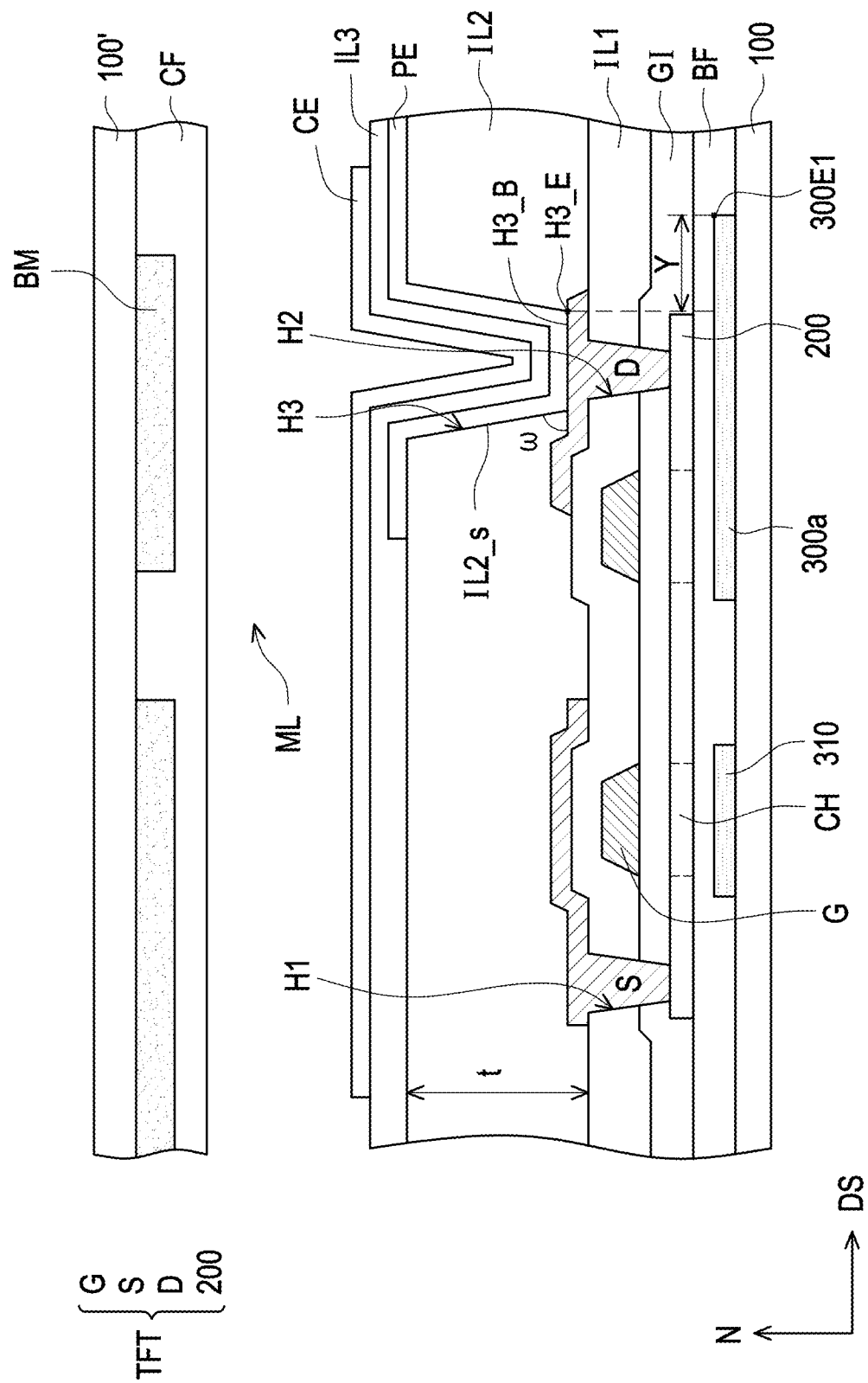
FIG. 2 is a cross-sectional schematic view based on the profile line A-A' of FIG. 1.

FIG. 1 is a top schematic view of an electronic device according to the first embodiment of the disclosure. FIG. 2 is a cross-sectional schematic view based on the profile line A-A' of FIG. 1. It is worth noting that some elements are omitted in FIG. 1.

Referring to FIG. 1 and FIG. 2 at the same time, an electronic device 10*a* of this embodiment includes a substrate 100, a semiconductor layer 200, and a light blocking layer 300*a*.

The substrate 100 is, for example, a flexible or inflexible substrate. The material of the substrate 100 may, for example, include glass, plastic or a combination thereof. For example, the material of the substrate 100 may include quartz, sapphire, polymethyl methacrylate (PMMA), polycarbonate (PC), polyimide (PI), polyethylene terephthalate (PET), other suitable materials, or a combination of the above materials, and disclosure is not limited thereto.

The semiconductor layer 200 is disposed on the substrate 100 and has a channel area CH. In detail, in this embodiment, the electronic device 10*a* includes a semiconductor element TFT. The semiconductor element TFT may include, for example, a gate G, a source S, a drain D, and the aforementioned semiconductor layer 200, but the disclosure is not limited thereto. For example, the gate G overlaps with the semiconductor layer 200 section in a normal direction N of the substrate 100, and the region where the semiconductor layer 200 overlaps with the gate G is regarded as the channel area CH. In some embodiments, a gate insulating layer GI is provided between the gate G and the semiconductor layer 200. The source S and the drain D are, for example, separated from each other and electrically connected to the semiconductor layer 200. In some embodiments, an insulating layer IL1 and the aforementioned gate insulating layer GI are disposed between the source S (or the drain D) and the semiconductor layer 200. The source S and the drain D are respectively electrically connected to the semiconductor layer 200 through a hole H1 and a hole H2 penetrating the insulating layer IL1 and the gate insulating layer GI, but the disclosure is not limited thereto. The material of the gate insulating layer GI and the insulating layer IL1 may include, for example, inorganic materials (e.g., silicon oxide, silicon nitride, silicon oxynitride, or a stacking layer of at least two of the above materials), organic materials (e.g., polyimide resin, epoxy resin, or acryl resin), or a combination of the above, but disclosure is not limited thereto. In some embodiments, the gate insulating layer GI and/or the insulating layer IL1 are monolayer structures or multilayer structures. The semiconductor element TFT is, for example, a top gate type thin film transistor. However, although this embodiment takes the top gate type thin film transistor as an example, the disclosure is not limited thereto.

The light blocking layer 300*a* is disposed on the substrate 100. In this embodiment, the light blocking layer 300*a* may be disposed between the substrate 100 and the semiconductor layer 200. For example, the light blocking layer 300*a* may be disposed between the substrate 100 and the channel area CH of the semiconductor layer 200, but the disclosure is not limited thereto. The light blocking layer 300*a* overlaps with at least a portion of the channel area CH of the semiconductor layer 200 in the normal direction N of the substrate 100 (e.g., a direction perpendicular to the upper surface of the substrate 100), thereby improving the channel area CH from being deteriorated due to the ambient light from the outside. In this embodiment, the light blocking layer 300a overlaps with the channel area CH of the semiconductor layer 200 in the normal direction N of the substrate 100. In some embodiments, the light blocking layer 300a may include a material with relatively low reflectivity and transmittance. For example, the light blocking layer 300a may include photoresist, ink, resin, colorant, metal and oxide thereof, other organic material, other suitable material, or a combination of the above. In some embodiments, the reflectivity of the light blocking layer 300a may be greater than or equal to 0% and less than 70%. In some embodiments, the light blocking layer 300a may include molybdenum, but the disclosure is not limited thereto.

In some embodiments, the electronic device 10a further includes an opposite substrate 100'. The opposite substrate 100' is, for example, disposed correspondingly to the substrate 100, and the material included in the opposite substrate 100' may be the same or similar to the substrate 100, which will not be repeated herein. In other embodiments, the opposite substrate 100' may be replaced by a package layer. The package layer may provide protection, packaging, and/or planarization functions for the light-emitting/display unit, and the package layer may include organic material, inorganic material, and any combinations or mixtures thereof, but not limited thereto. In some embodiments, a light blocking pattern BM and a color filter CF may be disposed on the opposite substrate 100', but the disclosure is not limited thereto. The light blocking pattern BM and the color filter CF are respectively disposed on the opposite substrate 100' facing the surface of the substrate 100, but the disclosure is not limited thereto. In other embodiments, the light blocking pattern BM and the color filter CF are, for example, respectively disposed on the surface of the substrate 100 facing the opposite substrate 100', but the disclosure is not limited thereto. The material of the light blocking pattern BM is, for example, a black resin or a metal material with low reflectivity, so as to block the internal elements and wires of the electronic device 10a that are not intended to be seen by the user, thereby improving the display performance of the electronic device 10a. The color filter CF may include, for example, a red filter pattern, a green filter pattern, or a blue filter pattern, so that the electronic device 10a has a colored display image, but the disclosure is not limited thereto. In addition, since the light blocking layer 300a may include, for example, materials with relatively low reflectivity and transmittance, in other embodiments, the configuration of the light blocking layer 300a may replace at least a portion of the light blocking pattern BM to enhance the opening rate.

In some embodiments, the electronic device 10a further includes a display medium layer ML. The display medium layer ML is, for example, disposed between the substrate 100 and the opposite substrate 100'. In this embodiment, the material of the display medium layer ML includes, for example, liquid crystal, but the disclosure is not limited thereto. The display medium included in the display medium layer ML is arranged, for example, by driving the semiconductor element TFT and the pixel electrode PE described below.

In some embodiments, the electronic device 10a further includes a spacer (not shown in this embodiment). The spacer is, for example, disposed on the semiconductor layer 200. In this embodiment, the spacer is disposed between the substrate 100 and the opposite substrate 100' to support the substrate 100 and/or the opposite substrate 100'. The material included in the spacer is not particularly limited, and may include, for example, organic materials and/or organic photosensitive materials, but the disclosure is not limited thereto. In some embodiments, the spacer may be trapezoidal.

In some embodiments, the electronic device 10a further includes an insulating layer BF, a gate line GL, a data line DL, an insulating layer IL2, a pixel electrode PE, an insulating layer IL3, and a common electrode CE. In some embodiments, other insulating layers (not shown) may be provided between the substrate 100 and the light blocking layer 300a, but the disclosure is not limited thereto.

The insulating layer BF is, for example, disposed on the substrate 100. In this embodiment, the insulating layer BF is disposed between the substrate 100 and the semiconductor layer 200 and covers the light blocking layer 300a, but the disclosure is not limited thereto. The material of the insulating layer BF may include, for example, an inorganic material (e.g., silicon oxide, silicon nitride, silicon oxynitride, or a stacking layer of at least two of the above materials), but the disclosure is not limited thereto.

Referring to FIG. 1 and FIG. 2, the gate line GL and the data line DL are, for example, disposed on the substrate 100. In this embodiment, the gate line GL is disposed on the gate insulating layer GI and extends along a first direction D1, and the data line DL is disposed on the insulating layer IL1 and extends along a second direction D2. The first direction D1 is different from the second direction D2 or the first direction D1 is perpendicular to the second direction D2, and the first direction D1 and the second direction D2 are also respectively perpendicular to the normal direction N. The gate G in the semiconductor element TFT may be, for example, electrically connected to a corresponding gate line GL to receive a corresponding gate signal, and the source S in the semiconductor element TFT may be, for example, electrically connected to a corresponding data line DL to receive a corresponding data signal. In some embodiments, the material of the gate line GL and the data line DL may include, for example, molybdenum (Mo), Titanium (Ti), Tantalum (Ta), Niobium (Nb), Hafnium (Hf), Nickel (Ni), Chromium (Cr), Cobalt (Co), Zirconium (Zr), Tungsten (W), Aluminum (Al), copper (Cu), silver (Ag), other suitable metal, alloy or combination of the above materials, and the disclosure is not limited thereto. The gate line GL and the data line DL may, for example, include the same or different material, and the disclosure is not limited thereto. In some embodiments, the gate line GL has a width $W_G$ (e.g., the maximum width in the second direction D2) in the second direction D2 (e.g., a direction perpendicular to the first direction D1), and the data line DL has a width $W_D$ (e.g., the maximum width in the first direction D1) in the first direction D1.

The insulating layer IL2 is, for example, disposed on the insulating layer IL1. In this embodiment, the insulating layer IL2 covers the source S and a portion of the drain D. That is, the insulating layer IL2 has a hole H3 that exposes a portion of the drain D, but the disclosure is not limited thereto. The material of the insulating layer IL2 may include, for example, inorganic materials (e.g., silicon oxide, silicon nitride, silicon oxynitride, or a stacking layer of at least two of the above materials), organic materials (e.g., polyimide resin, epoxy resin, or acryl resin), or a combination of the above, but disclosure is not limited thereto. In this embodiment, the material of the insulating layer IL2 is, for example, an organic material, but the disclosure is not limited thereto.

In some embodiments, the insulating layer IL2 has a thickness t and a side wall IL2_s at the hole H3 thereof. The side wall IL2_s of the insulating layer IL2 and a direction DS parallel to the surface of the substrate 100 have an included angle ω. In detail, the direction DS herein is, for example, any extended direction on the surface of the substrate 100 facing or facing away from the opposite substrate 100'. Thus, the direction DS is, for example, perpendicular to the normal direction N of the substrate 100. In some embodiments, the hole H3 of the insulating layer IL2 has a lower bottom surface H3_B. In some embodiments, the lower bottom surface H3_B of the hole H3 has an edge H3_E, and the light blocking layer 300a has an edge 300E1 near the edge H3_E. The edge 300E1 of the light blocking layer 300a and the edge H3_E of the hole H3 have a distance Y in the direction DS.

In this embodiment, the light blocking layer 300a overlaps with the hole H3 of the insulating layer IL2 in the normal direction N of the substrate 100, but the disclosure is not limited thereto. In detail, in this embodiment, the thickness t of the insulating layer IL2, the included angle ω between the side wall IL2_s of the insulating layer IL2 and the direction DS, and the distance Y between the edge 300E1 of the light blocking layer 300a and the edge H3_E of the hole H3 satisfy the following relational expression 1: $t*\cot(\omega) \leq Y \leq t*\cot(\omega)+10$ m. In some embodiments, since the thickness of the insulating layer IL2 is greater than that of the remaining insulating layers, the depth of the hole H3 of the insulating layer IL2 is therefore deeper than the holes of the remaining layers. In this case, the inversion of the liquid crystal in the region forming the hole H3 of the insulating layer IL2 is seriously affected by the terrain, and may not be able to present the inversion as expected. As a result, the liquid crystal is unable to be controlled as expected, resulting in liquid crystal disclination, which may cause a problem that deteriorates the display image quality of the electronic device 10a. Based on this, by making the thickness t of the insulating layer IL2, the included angle ω between the side wall IL2_s of the insulating layer IL2 and the direction DS, and the distance Y between the edge 300E1 of the light blocking layer 300a and the edge H3_E of the hole H3 satisfy the above relational expression 1, the light blocking layer 300a of this embodiment may be used to block the regions where the liquid crystal is not well arranged due to the formation of the hole H3 of the insulating layer IL2. The display quality of the electronic device 10a is thereby improved or enhanced. In addition, in some embodiments, the electronic device 10a further includes a light blocking layer 310. The light blocking layer 310 and the light blocking layer 300a may, for example, belong to the same layer and be patterns separated from each other. As shown in FIG. 1 and FIG. 2, the light blocking layer 310 also overlaps with at least a portion of the channel area CH of the semiconductor layer 200 in the normal direction N of the substrate 100 (e.g., a direction perpendicular to the upper surface of the substrate 100). In this way, the situation in which the channel area CH is affected and deteriorated by the ambient light (e.g., the light from the back-light source) is improved. It is worth noting that the difference between the light blocking layer 310 and the light blocking layer 300a is that the light blocking layer 300a overlaps with the hole H3 of the insulating layer IL2 in the normal direction N of the substrate 100.

In addition, in other embodiments, in response to the substrate 100 and the opposite substrate 100' being paired and generating an offset, the thickness t of the insulating layer IL2, the included angle ω between the side wall IL2_s of the insulating layer IL2 and the direction DS, and the distance Y between the edge 300E1 of the light blocking layer 300a and the edge H3_E of the hole H3 may be made to satisfy the above relational expression 1. The color mixing phenomenon caused by the inability of the light blocking pattern BM to completely block the region with the hole H3 of the insulating layer IL2 may also be reduced. The reason is that the light blocking layer 300a may replace at least a portion of light blocking pattern BM in this embodiment to block the regions where the liquid crystal is not well arranged due to the formation of the hole H3 of the insulating layer IL2, thereby improving the display performance of the electronic device 10a.

The pixel electrode PE is disposed on the insulating layer IL2. In this embodiment, the pixel electrode PE is electrically connected to the drain D through the hole H3 of the insulating layer IL2, but the disclosure is not limited thereto. The material of the pixel electrode PE may include, for example, metal oxide conductive materials (e.g., indium tin oxide, indium zinc oxide, aluminum tin oxide, aluminum zinc oxide, indium germanium zinc oxide), but the disclosure is not limited thereto.

The insulating layer IL3 is, for example, disposed on the insulating layer IL2. In this embodiment, the insulating layer IL3 covers the pixel electrode PE disposed on the insulating layer IL2, but the disclosure is not limited thereto. The material of the insulating layer IL3 may include, for example, inorganic materials (e.g., silicon oxide, silicon nitride, silicon oxynitride, or a stacking layer of at least two of the above materials), organic materials (e.g., polyimide resin, epoxy resin, or acryl resin), or a combination of the above, but disclosure is not limited thereto. In some embodiments, the insulating layer IL3 is partially filled in the hole H3 of the insulating layer IL2, but the disclosure is not limited thereto.

The common electrode CE is, for example, disposed on the insulating layer IL3. The material of the common electrode CE may include, for example, metal oxide conductive materials (e.g., indium tin oxide, indium zinc oxide, aluminum tin oxide, aluminum zinc oxide, indium germanium zinc oxide), but the disclosure is not limited thereto. In some embodiments, the common electrode CE is also partially filled in the hole H3 of the insulating layer IL2, but the disclosure is not limited thereto.

Figure 3:
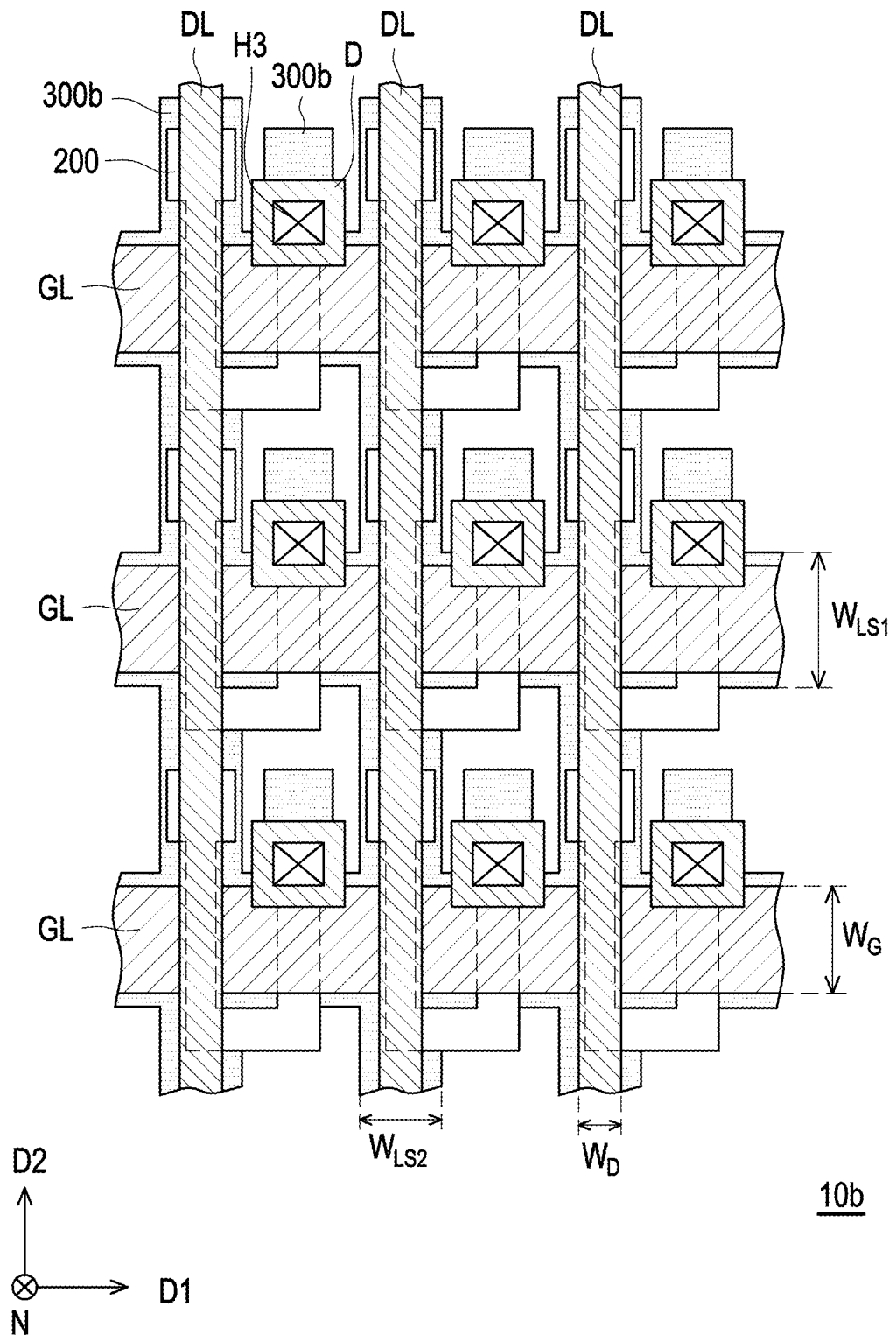
FIG. 3 is a top schematic view of an electronic device according to the second embodiment of the disclosure.

FIG. 3 is a top schematic view of an electronic device according to the second embodiment of the disclosure. It is noted that the embodiment of FIG. 3 may use the reference numerals and a part of the contents of the embodiment of FIG. 1, and the same or similar reference numerals are used to denote the same or similar elements, and the description of the same technical content is omitted.

The difference between the electronic device 10b in FIG. 3 and the aforementioned electronic device 10a is that the light blocking layer 300b is disposed corresponding to the light blocking pattern BM on the opposite substrate 100', and the light blocking layer 300b may, for example, have a mesh structure. For example, in the electronic device 10b of this embodiment, the light blocking layer 300b has a width $W_{LS1}$ in the second direction D2, and the light blocking layer 300b has a width $W_{LS2}$ in the first direction D1. Moreover, in the electronic device 10b of this embodiment, the width $W_G$ of the gate line GL in the second direction D2 and the width $W_{LS1}$ of the light blocking layer 300 in the second direction D2 satisfy the following relational expression 2: $W_G \leq W_{LS1} \leq 10*W_G$. The width $W_D$ of the data line DL in the first direction D1 and the width $W_{LS2}$ of the light blocking layer 300 in the first direction D1 satisfy the following relational expression 3: $W_D \leq W_{LS2} \leq 10*W_D$, but the disclosure is not limited thereto.

In other embodiments, the light blocking pattern BM included in the opposite substrate 100' is designed to at least block the light reflected by the gate line GL and/or the data line DL. Thus, in response to the width $W_G$ of the gate line GL and the width $W_{LS1}$ of the light blocking layer 300b satisfying the relational expression 2 and/or the width $W_D$ of the data line DL and the width $W_{LS2}$ of the light blocking layer 300b satisfying the relational expression 3, the light blocking layer 300b is disposed corresponding to the light blocking pattern BM (e.g., the light blocking layer 300b may overlap with at least a portion of the light blocking pattern BM along the normal direction N of the substrate 100). In this way, the light blocking layer 300b and the light blocking pattern BM may block the elements and wirings inside the electronic device 10b. Based on this, the light blocking layer 300b of this embodiment may also have a pattern similar to the light blocking pattern BM, but the disclosure is not limited thereto. The light blocking layer 300b and the light blocking pattern BM may correspond to the gate line GL or the data line DL, or both the gate line GL and the data line DL. In this embodiment, the light blocking layer 300b may have an area larger than the light blocking pattern BM in the normal direction N of the substrate 100. In other embodiments, the material included in the light blocking layer 300b is, for example, a metal material with a reflectivity greater than or equal to 0% and less than 70%. Thus, even if a portion of the light blocking layer 300b is not blocked by the light blocking pattern BM, the display quality of the electronic device 10b may still be maintained.

In detail, in response to the width $W_G$ of the gate line GL and the width $W_{LS1}$ of the light blocking layer 300b satisfying the relational expression 2, the light blocking layer 300b may at least be used to block the light reflected by the gate line GL (e.g., the ambient light). In response to the width $W_D$ of the data line DL and the width $W_{LS2}$ of the light blocking layer 300b satisfying the relational expression 3, the light blocking layer 300b may at least be used to block the light reflected by the data line DL (e.g., the ambient light). In other embodiments, since the light blocking layer 300b may be disposed on the same substrate (substrate 100) as the gate line GL and the data line DL (e.g., both are formed on the substrate 100), in response to the substrate 100 and the opposite substrate 100' being paired and generating an offset, the possibility of obtaining a poor color mixing phenomenon caused by the inability of the light blocking pattern BM to completely block the light reflected by the gate line GL and the data line DL may be reduced. The display performance of the electronic device 10b is thereby enhanced. Alternatively, in the embodiment that the light blocking layer 300b and the light blocking pattern BM are disposed correspondingly, the configuration area of the light blocking pattern BM may be relatively reduced. Thus, since the process of forming the light blocking layer 300b on the substrate 100 is more stable than the process of forming the light blocking pattern BM on the opposite substrate 100', the electronic device 10b of this embodiment may reduce the configuration area of the light blocking pattern BM through the formation of the light blocking layer 300b, thereby reducing the drop of the opening rate caused by process variation.

Figure 4:
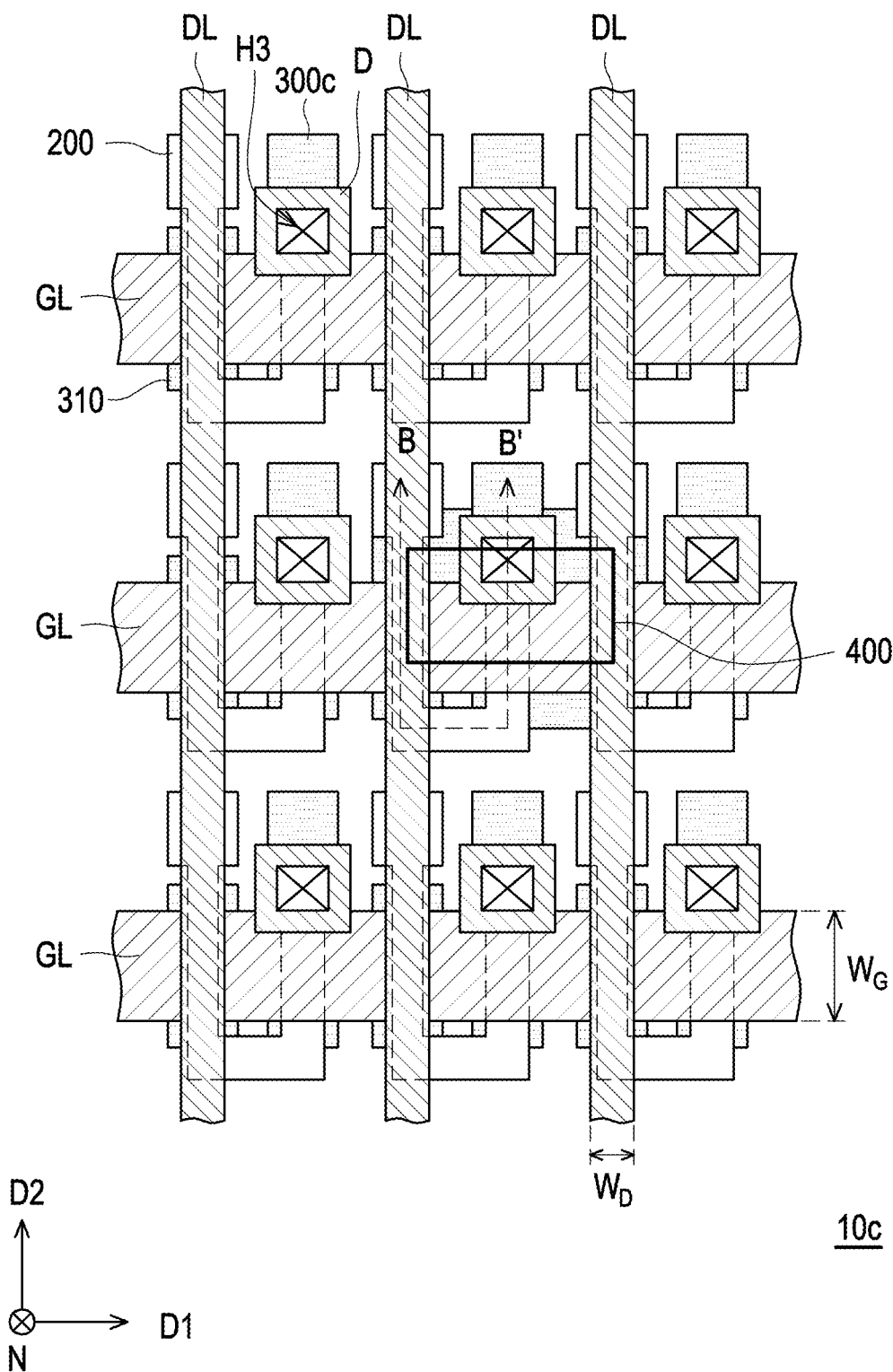
FIG. 4 is a top schematic view of an electronic device according to the third embodiment of the disclosure.
Figure 5:
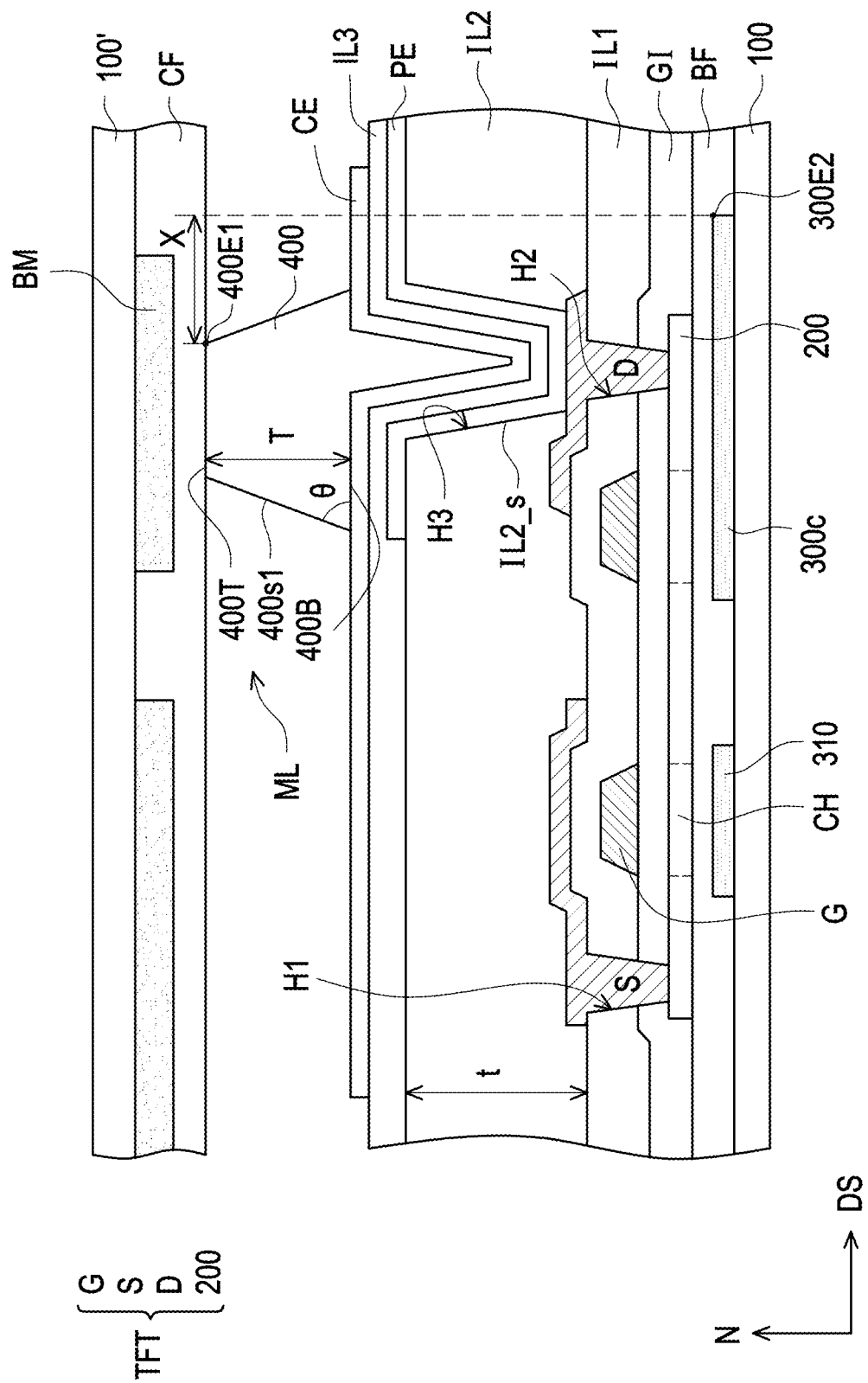
FIG. 5 is a cross-sectional schematic view based on the profile line B-B' of FIG. 4.

FIG. 4 is atop schematic view of an electronic device according to the third embodiment of the disclosure, and FIG. 5 is a cross-sectional schematic view based on the profile line B-B' of FIG. 4. It is noted that the embodiments of FIG. 4 and FIG. 5 may use the reference numerals and a part of the contents of the embodiments of FIGS. 1 and 2 respectively, and the same or similar reference numerals are used to denote the same or similar elements, and the description of the same technical content is omitted.

The difference between the electronic device 10c in FIG. 4 and the aforementioned electronic device 10a is that the light blocking layer 300c is disposed corresponding to the spacer 400. It should be noted that although the electronic device 10a in FIG. 1 omits the illustration of the spacer, the light blocking layer 300a of the electronic device 10a may also be disposed corresponding to the spacer.

The spacer 400 is, for example, disposed on the semiconductor layer 200. The light blocking layer 300c overlaps with at least a portion of the spacer 400 and the channel area CH of the semiconductor layer 200 in the normal direction N of the substrate. In this embodiment, the spacer 400 is disposed between the substrate 100 and the opposite substrate 100' to support the substrate 100 and/or the opposite substrate 100'. The material included in the spacer 400 is not particularly limited, and may include, for example, organic materials and/or organic photosensitive materials, but the disclosure is not limited thereto. In some embodiments, the area of the upper bottom surface 400T of the spacer 400 is smaller than the area of the lower bottom surface 400B of the spacer 400. That is, the embodiment that the spacer 400 may be trapezoidal. In some embodiments, the spacer 400 includes a side wall 400s1, and the side wall 400s1 of the spacer 400 and the direction DS parallel to the surface of the substrate 100 have an included angle Θ.

In some embodiments, the spacer 400 has a thickness T in the normal direction N of the substrate 100. The thickness T of the spacer 400 is, for example, approximately the distance between the substrate 100 and the opposite substrate 100', but the disclosure is not limited thereto. In some embodiments, the upper bottom surface 400T of the spacer 400 has an edge 400E1, and the light blocking layer 300c has an edge 300E2 near the edge 400E1 of the spacer 400. The edge 300E2 of the light blocking layer 300c and the edge 400E1 of the spacer 400 has a distance X in the direction DS.

In this embodiment, the light blocking layer 300c overlaps with the spacer 400 in the normal direction N of the substrate 100. In detail, in this embodiment, the thickness T of the spacer 400, the included angle Θ between the side wall 400s1 of the spacer 400 and the direction DS, and the distance X between the edge 400E1 of the spacer 400 and the edge 300E2 of the light blocking layer 300c may satisfy the following relational expression 4: $T*\cot(\Theta) \leq X \leq T*\cot(\Theta)+15$ m. Since the inversion of the liquid crystal in the region where the spacer 400 is disposed is affected by the terrain and the inversion is unable to be presented as expected, the liquid crystal molecular is unable to be controlled as expected, resulting in liquid crystal disclination and causing the poor display quality of the electronic device 10c. Based on this, the above relational expression 4 is satisfied by making the thickness T of the spacer 400, the included angle Θ between the side wall 400s1 of the spacer 400 and the direction DS, and the distance X between the edge 400E1 of the spacer 400 and the edge 300E2 of the light blocking layer 300c. The light blocking layer 300c of this embodiment may block (1) a scratched region in contact with the spacer 400 and/or (2) the region with poor liquid crystal arrangement that overlaps with the spacer 400 in the normal direction N of the substrate 100 due to the configuration of the spacer 400, thereby maintain a good display quality.

In some embodiment, in response to the substrate 100 and the opposite substrate 100' being paired and generating an offset, the above relational expression 4 is satisfied by making the thickness T of the spacer 400, the included angle Θ between the side wall 400s1 of the spacer 400 and the direction DS, and the distance X between the edge 400E1 of the spacer 400 and the edge 300E2 of the light blocking layer 300c. The possibility of obtaining a poor color mixing phenomenon caused by the inability of the light blocking pattern BM to completely block the region with the spacer 400 disposed may be reduced. The display performance of the electronic device 10c is thereby enhanced.

In addition, in other embodiments, the light blocking layer 300c in the electronic device 10c may also overlap with the hole H3 of the insulating layer IL2 in the normal direction N of the substrate 100, but the disclosure is not limited thereto. In detail, the electronic device 10c may also satisfy the above relational expression 1, so that the light blocking layer 300c of this embodiment is used to block the region with poor liquid crystal arrangement caused by the formation of the hole H3 of the insulating layer IL2, thereby maintaining the display quality of the electronic device 10c. In other embodiments, the spacer 400 may overlap with at least a portion of the hole H3 and the light blocking layer 300c in the normal direction N, so as to improve the opening rate of the display apparatus. In some embodiments, the spacer 400 may partially fill in the hole H3, but the disclosure is not limited thereto.

Figure 6:
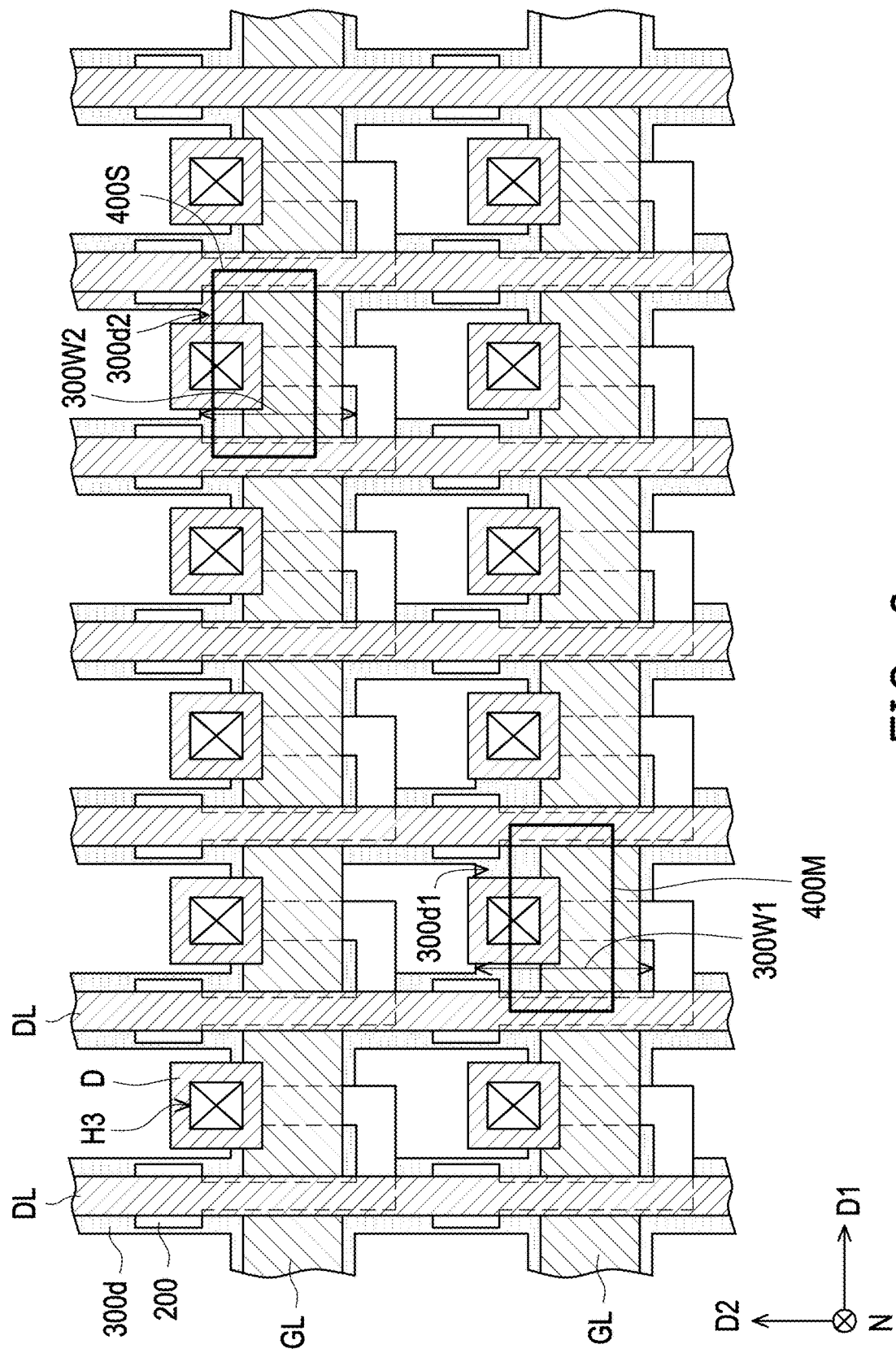
FIG. 6 is a partial cross-sectional schematic view of an electronic device according to the fourth embodiment of the disclosure.

FIG. 6 is a partial cross-sectional schematic view of an electronic device according to the fourth embodiment of the disclosure. It is noted that the embodiment of FIG. 6 may use the reference numerals and a part of the contents of the embodiment of FIG. 4, and the same or similar reference numerals are used to denote the same or similar elements, and the description of the same technical content is omitted.

The difference between the electronic device 10d in FIG. 6 and the aforementioned electronic device 10c is that the spacer 400 includes a main spacer 400M and a sub spacer 400S, and the area of the light blocking layer 300d disposed corresponding to the main spacer 400M may be larger than the area of the light blocking layer 300d disposed corresponding to the sub spacer 400S.

In this embodiment, the thickness of the main spacer 400M (e.g., the thickness T of the spacer 400 in the electronic device 10c) is, for example, greater than the thickness of the sub spacer 400S. Specifically, the lower bottom surface of the main spacer 400M abuts against the element disposed on the substrate 100, and the upper bottom surface of the main spacer 400M abuts against the element disposed on the opposite substrate 100'. In addition, the lower bottom surface of the sub spacer 400S abuts against the element disposed on the substrate 100, and a distance is provided between the upper bottom surface of the sub spacer 400S and the element disposed on the opposite substrate 100', but the disclosure is not limited thereto. In other embodiments, the sub spacer 400S may be, for example, formed on the opposite substrate 100'. For example, there may be a distance between the upper bottom surface of the spacer 400S (the surface nearer to the substrate 100) and the element disposed on the substrate 100. Moreover, the lower bottom surface of the sub spacer 400S (e.g., the surface near the opposite substrate 100') may abut against the element disposed on the opposite substrate 100', but the disclosure is not limited thereto.

Since the thickness of the main spacer 400M is greater than the thickness of the sub spacer 400S, compared to the region disposed with the sub spacer 400S, liquid crystal disclination is more likely to present in the region disposed with the main spacer 400M. Therefore, in some embodiments, the area of the light blocking layer 300d disposed corresponding to the main spacer 400M is larger than the area of the light blocking layer 300d disposed corresponding to the sub spacer 400S. In detail, as shown in FIG. 6, in this embodiment, the width (e.g., the maximum width) 300W1 of the first section 300d1 of the light blocking layer 300d disposed corresponding to the main spacer 400M in the second direction D2 (e.g., the direction perpendicular to the extension direction of the gate line GL) is greater than the width (e.g., the maximum width) 300W2 of the second section 300d2 of the light blocking layer 300d disposed corresponding to the sub spacer 400S in the second direction D2, which makes the area of the light blocking layer 300d (first section 300d1) disposed corresponding to the main spacer 400M larger than the area of the light blocking layer 300d (second section 300d2) disposed corresponding to the sub spacer 400S, but the disclosure is not limited thereto. In other embodiments, the area of the light blocking layer 300d disposed corresponding to the main spacer 400M may be equal to the area of the light blocking layer 300d disposed corresponding to the sub spacer 400S, but the disclosure is not limited thereto.

Figure 7:
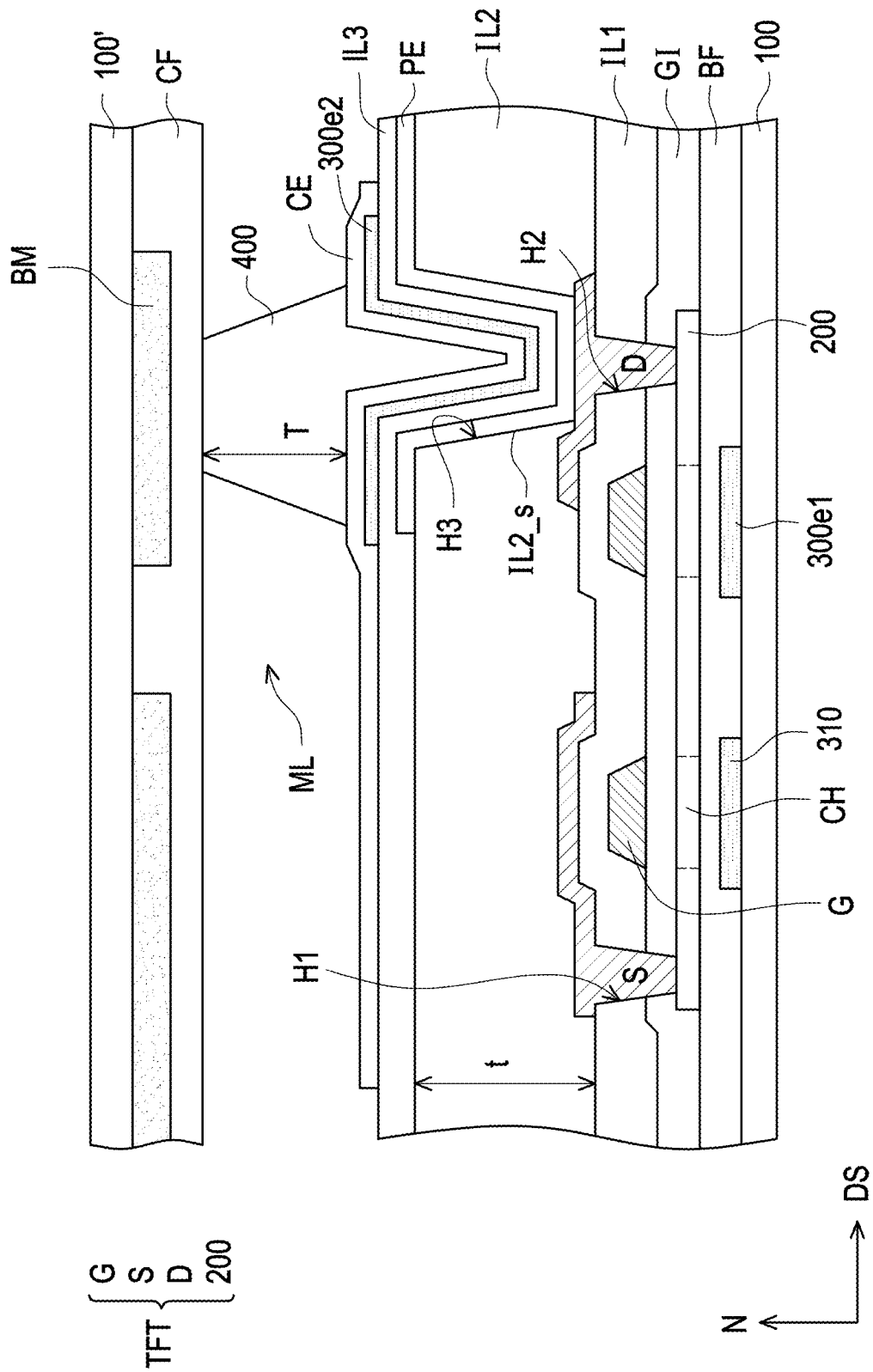
FIG. 7 is a partial cross-sectional schematic view of an electronic device according to the fifth embodiment of the disclosure.

FIG. 7 is a partial cross-sectional schematic view of an electronic device according to the fifth embodiment of the disclosure. It is noted that the embodiment of FIG. 7 may use the reference numerals and a part of the contents of the embodiment of FIG. 5, and the same or similar reference numerals are used to denote the same or similar elements, and the description of the same technical content is omitted.

The difference between the electronic device 10e in FIG. 7 and the aforementioned electronic device 10c is that the light blocking layer includes a first light blocking layer 300e1 and a second light blocking layer 300e2, The first light blocking layer 300e1 is disposed between the substrate 100 and the channel area CH of the semiconductor layer 200, and the second light blocking layer 300e2 is disposed between the semiconductor element TFT and the spacer 400. It should be noted that although the electronic device of the aforementioned embodiment does not show the second light blocking layer 300e2, the second light blocking layer 300e2 may be mixed and matched with the aforementioned embodiment.

In this embodiment, the configuration relationship between the first light blocking layer 300e1 between the substrate 100 and the semiconductor layer 200 is similar to the aforementioned light blocking layer 300a, light blocking layer 300b, light blocking layer 300c, and light blocking layer 300d, the main difference is that the first light blocking layer 300e1 is not restricted to overlap with the hole H3, the light blocking pattern BM, and/or the spacer 400 in the normal direction N of substrate 100. However, the first light blocking layer 300e1 still overlaps with at least a portion of the channel area CH of the semiconductor layer 200 in the normal direction N of the substrate 100, thereby reducing the probability of the channel area CH being affected and deteriorated by the ambient light from the outside. In some embodiments, the first light blocking layer 300e1 overlaps with the channel area CH of the semiconductor layer 200 in the normal direction N of the substrate 100.

In some embodiments, the second light blocking layer 300e2 is disposed between the common electrode CE and the insulating layer IL3. The second light blocking layer 300e2 may be, for example, in contact with the common electrode CE, and partially filled in the hole H3 of the insulating layer IL2, but the disclosure is not limited thereto. In this embodiment, the second light blocking layer 300e2 may overlap with at least a portion of the spacer 400. In this way, the (1) scratched region in contact with the spacer 400 and/or (2) the region with poor liquid crystal arrangement that substantially overlaps with the spacer 400 in the normal direction N of the substrate 100 due to the configuration of the spacer 400 is blocked, thereby maintaining the display quality of the electronic device 10e. In addition, in some embodiments, the second light blocking layer 300e2 may also overlap with the hole H3 of the insulating layer IL2 in the normal direction N of the substrate 100, so that the second light blocking layer 300e2 may be used to block the region where the liquid crystal arrangement is poor due to the formation of the hole H3 of the insulating layer IL2. In other embodiments, the light blocking layer may be, for example, a mesh structure, which is similar in shape to the light blocking layer 300d in FIG. 6, but the disclosure is not limited thereto.

In some embodiments, the material of the first light blocking layer 300e1 and the second light blocking layer 300e2 is the same as or similar to that of the aforementioned light blocking layer 300a, which will not be repeated herein.

Based on the above, the light blocking layer included in the electronic device of the embodiment of the disclosure has a novel design. The light blocking layer may overlap with at least a portion of the spacer in the normal direction of the substrate, or make the light blocking layer meet relational expression 4, so that the opening rate of the electronic device of the embodiment of the disclosure is enhanced. In other embodiments, the process of forming the light blocking layer on the substrate is more stable than the process of forming the light blocking pattern on the opposite substrate. Thus, the electronic device of the embodiment of the disclosure may reduce the configuration area of the light blocking pattern by forming a light blocking layer on the substrate, thereby reducing the drop of the opening rate caused by process variation. In other embodiments, in response to the spacer and the light blocking layer being disposed on the same substrate, by forming a light blocking layer, the electronic device of the embodiment of the disclosure may reduce the probability of a drop of the opening rate caused by the offset between the substrate and the opposite substrate.

In other embodiments, to enhance the opening rate of the electronic device of the embodiment of the disclosure, the light blocking layer of the embodiment of the disclosure may block the insulating layer with a deeper opening (where the pixel electrode and the common electrode are disposed) in the normal direction of the substrate. Alternatively, the aforementioned light blocking layer may be made to satisfy the relational expression 1.

In some other embodiments, to enhance the opening rate of the electronic device of the embodiment of the disclosure, the light blocking layer of the embodiment of the disclosure may overlap with at least a portion of the light blocking pattern in the normal direction of the substrate. Alternatively, the aforementioned light blocking layer may be made to satisfy the relational expression 2 and/or the relational expression 3.

Finally, it should be noted that the above embodiments are only used to illustrate the technical solutions of the disclosure and are not intended to limit it. Although the disclosure has been described in detail with reference to the above embodiments, persons of ordinary skill in the art should understand that they may still modify the technical solutions described in the above embodiments, or replace some or all of the technical features therein with equivalents, and that such modifications or replacements of corresponding technical solutions do not substantially deviate from the scope of the technical solutions of the embodiments of the disclosure. As long as the features of the embodiments do not violate the spirit of the disclosure or conflict each other, they may be mixed and matched as desired.

What is claimed is:

1. An electronic device, comprising:
   a substrate;
   a gate line, disposed on the substrate and extending along a first direction;
   two adjacent data lines, disposed on the substrate and intersected with the gate line;
   a semiconductor layer, disposed on the substrate and having a channel area; and
   a metal layer, disposed between the substrate and the semiconductor layer, wherein the metal layer is overlapped with the two adjacent data lines,
   wherein the metal layer has a section overlapped with the channel area, the section has a first width along a second direction perpendicular to the first direction, the gate line has a second width along the second direction, and the first width and the second width satisfy a relational expression below:
   $W_G \leq W_{LS1} \leq 10*W_G$, $W_{LS1}$ is the first width, and $W_G$ is the second width.

2. The electronic device according to claim 1, further comprising:
   a spacer, disposed on the channel area and overlapped with the section of the metal layer and the channel area.

3. The electronic device according to claim 2, wherein the first width of the section of the metal layer is greater than a third width of the spacer along the second direction.

4. The electronic device according to claim 2, wherein a portion of the metal layer extends along the second direction.

5. The electronic device according to claim 2, further comprising:
   an insulating layer, disposed between the metal layer and the spacer, wherein the insulating layer comprises a hole.

6. The electronic device according to claim 5, wherein the section of the metal layer is overlapped with the hole of the insulating layer.

7. The electronic device according to claim 5, wherein the spacer is overlapped with the hole of the insulating layer.

8. The electronic device according to claim 1, further comprising:
   a light blocking pattern, disposed on the metal layer and overlapped with at least portion of the metal layer.

9. The electronic device according to claim 8, further comprising:
   a color filter, overlapped with at least portion of the light blocking pattern.

10. The electronic device according to claim 9, wherein a material of the light blocking pattern comprises a black resin.

* * * * *